(12) United States Patent
Botts

(10) Patent No.: US 10,514,125 B1
(45) Date of Patent: *Dec. 24, 2019

(54) UNDERGROUND PIPE REPAIR DEVICE WITH RETENTION DEVICE AND RELATED SYSTEMS AND METHODS

(71) Applicant: INNERCURE TECHNOLOGIES, LLC, Altamonte Springs, FL (US)

(72) Inventor: Jerold L Botts, Orlando, FL (US)

(73) Assignee: InnerCure Technologies, LLC, Orlando, FL (US)

(*) Notice: Subject to any disclaimer, the term of this patent is extended or adjusted under 35 U.S.C. 154(b) by 0 days.

This patent is subject to a terminal disclaimer.

(21) Appl. No.: 16/164,008

(22) Filed: Oct. 18, 2018

Related U.S. Application Data

(63) Continuation-in-part of application No. 15/943,837, filed on Apr. 3, 2018, now Pat. No. 10,309,575, which is a continuation-in-part of application No. 15/485,444, filed on Apr. 12, 2017, now Pat. No. 9,933,105.

(51) Int. Cl.
*F16L 55/162* (2006.01)
*F16L 55/18* (2006.01)
*F16L 55/165* (2006.01)

(52) U.S. Cl.
CPC .......... *F16L 55/18* (2013.01); *F16L 55/165* (2013.01)

(58) Field of Classification Search
CPC . F16L 55/165; F16L 55/1651; F16L 55/1652; F16L 55/1653; F16L 55/1656; F16L 55/162; F16L 55/18; F16L 55/179

USPC ...................................................... 405/184.2
See application file for complete search history.

(56) References Cited

U.S. PATENT DOCUMENTS

| | | |
|---|---|---|
| 5,329,063 A | 7/1994 | Endoh |
| 5,439,033 A | 8/1995 | Kamiyama et al. |
| 5,454,401 A | 10/1995 | Kamiyama et al. |
| 5,566,719 A | 10/1996 | Kamiyama et al. |
| 5,598,873 A | 2/1997 | Kamiyama et al. |
| 5,916,406 A | 6/1999 | Kamiyama et al. |
| 5,944,058 A | 8/1999 | Kamiyama et al. |
| 5,971,031 A | 10/1999 | Kamiyama et al. |
| 6,006,787 A | 12/1999 | Kamiyama et al. |
| 6,085,794 A | 7/2000 | Kamiyama et al. |
| 6,103,052 A | 8/2000 | Kamiyama et al. |
| 6,123,109 A | 9/2000 | Kamiyama et al. |
| 6,152,184 A | 11/2000 | Kamiyama et al. |
| 6,158,473 A | 12/2000 | Kamiyama et al. |

(Continued)

*Primary Examiner* — Frederick L Lagman
(74) *Attorney, Agent, or Firm* — Allen, Dyer, Doppelt + Gilchrist, PA

(57) ABSTRACT

An underground pipe repair device is for a joint between a service pipe and a branch pipe. The underground pipe repair device may include a T-shaped joint liner having a base portion extending laterally in the service pipe, and an arm portion extending vertically into the branch pipe, and a retention device embedded in the base portion adjacent an opening in the branch pipe. The underground pipe repair device may include an alignment device to be coupled to the retention device, and a service pipe liner extending in the service pipe and under the T-shaped joint liner and the alignment device. The alignment device extending vertically into the service pipe so that the service pipe liner has a radial bump about the opening in the branch pipe.

18 Claims, 12 Drawing Sheets

(56) References Cited

U.S. PATENT DOCUMENTS

| | | | |
|---|---|---|---|
| 6,994,118 B2 | 2/2006 | Kiest, Jr. et al. | |
| 7,028,716 B2 | 4/2006 | Kaneta et al. | |
| 7,121,305 B2 | 10/2006 | Kaneta et al. | |
| 7,398,797 B2 | 7/2008 | Kamiyama et al. | |
| 7,987,873 B2 | 8/2011 | Kiest, Jr. | |
| 8,636,036 B2 | 1/2014 | Kiest, Jr. | |
| 8,667,992 B2 | 3/2014 | Kiest, Jr. | |
| 8,689,835 B2 | 4/2014 | Kiest, Jr. | |
| 9,261,221 B2 | 2/2016 | Kiest, Jr. | |
| 9,481,974 B2 | 11/2016 | Kiest, Jr. | |
| 9,499,955 B2 | 11/2016 | Kiest, Jr. et al. | |
| 9,933,105 B1 * | 4/2018 | Botts | F16L 55/165 |
| 2006/0005893 A1 | 1/2006 | Kaneta et al. | |
| 2008/0029177 A1 | 2/2008 | Kamiyama et al. | |
| 2008/0245433 A1 | 10/2008 | Warren | |
| 2009/0056823 A1 | 3/2009 | Kiest, Jr. | |
| 2011/0203719 A1 | 8/2011 | Kiest, Jr. | |
| 2012/0261015 A1 | 10/2012 | Warren | |
| 2013/0213513 A1 | 8/2013 | Kiest, Jr. | |
| 2013/0249208 A1 | 9/2013 | Kiest, Jr. | |
| 2015/0267375 A1 | 9/2015 | Kiest, Jr. | |
| 2016/0010781 A1 | 1/2016 | Kiest, Jr. et al. | |
| 2016/0223121 A1 | 8/2016 | Kiest, Jr. | |
| 2016/0223122 A1 | 8/2016 | Kiest, Jr. | |
| 2016/0348827 A1 | 12/2016 | Kiest, Jr. et al. | |
| 2016/0348828 A1 | 12/2016 | Mathey et al. | |
| 2017/0146178 A1 | 5/2017 | Kiest, Jr. | |

* cited by examiner

UNDERGROUND PIPE REPAIR DEVICE WITH RETENTION DEVICE AND RELATED SYSTEMS AND METHODS

RELATED APPLICATION

This application is a continuation-in-part of prior filed copending application Ser. No. 15/943,837 filed Apr. 3, 2018, which is a continuation-in-part of prior filed copending application Ser. No. 15/485,444 filed Apr. 12, 2017, now U.S. Pat. No. 9,933,105, the entire subject matter of which is incorporated herein by reference in its entirety.

TECHNICAL FIELD

The present disclosure relates to the field of underground pipe repair, and, more particularly, to underground sewer pipe repair devices and related methods.

BACKGROUND

Pervasive gravity based sewer systems have been the hallmark of advanced human civilization since the Roman Empire. In most modern metropolitan applications, the service sewer pipe (i.e. the "main") runs along a street, and adjacent properties each connect to the service sewer pipe via a respective branch sewer pipe. Over time, subterranean pressure and moisture cause deterioration in a joint between each branch sewer pipe and the service sewer pipe. One approach is to excavate and replace each of the branch and service sewer pipes. Of course, although functionally ideal, the approach is very expensive and disruptive to property owners.

Another approach to this issue is excavationless/trenchless repair of the branch and service sewer pipes via a relining process. In particular, the approach includes relining the joint between each branch sewer pipe and the service sewer pipe. In typical approaches to fixing a leak in the sewer connection, a new liner is applied to the service sewer pipe. The branch sewer pipe also receives a new liner. The prior art process includes applying a specially shaped liner for the joint, for example, a vertically inverted T-shaped liner that extends upward into the branch sewer pipe. The typical approach includes subsequently applying a new liner for the service sewer pipe. The problem with this approach is that the joint portion of the liner may be damaged during the application of the liner for service sewer pipe, in particular, the steps of curing the liner for the service sewer pipe and cutting an opening in that new liner of the service sewer pipe at the joint.

SUMMARY

Generally, an underground pipe repair device is for a joint between a service pipe and a branch pipe. The underground pipe repair device may include a T-shaped joint liner having a base portion extending laterally in the service pipe, and an arm portion extending vertically into the branch pipe, and at least one retention device embedded in the base portion adjacent an opening in the branch pipe. The underground pipe repair device may include an alignment device to be coupled to the at least one retention device, and a service pipe liner extending in the service pipe and under the T-shaped joint liner and the alignment device. The alignment device may extend vertically into the service pipe so that the service pipe liner has a radial bump about the opening in the branch pipe.

Each retention device may comprise an elongate body, and a plurality of tabs extending laterally from the elongate body, the elongate body defining a recess therein. The alignment device may be at least partially received by the recess.

In some embodiments, the alignment device may include a first annular spacer aligned with the opening in the branch pipe and being coupled to the at least one retention device at an underside of the T-shaped joint liner, a second annular spacer aligned with the opening in the branch pipe and being coupled to the at least one retention device, the first annular spacer being radially within the second annular spacer, and a third annular spacer aligned with the opening in the branch pipe and being coupled to the at least one retention device at the underside of the T-shaped joint liner. The second annular spacer may be radially within the third annular spacer, and at least one of second annular spacer and the third annular spacer may comprise a swellable seal.

Also, at least one of second annular spacer and the third annular spacer may comprise a color coded material for indicating a location of a cutting incision. The first annular spacer may extend vertically into the service pipe to define the radial bump about the opening in the branch pipe. The first annular spacer and the second annular spacer may each have a greater height than the third annular spacer. The first and second annular spacers may each comprise a plastic material.

In another embodiment, the alignment device may comprise an annular spacer aligned with the opening in the branch pipe and being coupled to the at least one retention device at an underside of the T-shaped joint liner. The annular spacer may include at least one radial step. The annular spacer may extend vertically into the service pipe to define the radial bump about the opening in the branch pipe.

Another aspect is directed to an underground pipe repair device for a joint between a service pipe and a branch pipe. The underground pipe repair device may comprise a T-shaped joint liner having a base portion extending laterally in the service pipe, and an arm portion extending vertically into the branch pipe, and at least one retention device embedded in the base portion adjacent an opening in the branch pipe. An alignment device is to be coupled to the at least one retention device. The alignment device may extend vertically into the service pipe so that a service pipe liner has a radial bump about the opening in the branch pipe.

Yet another aspect is directed to a method for operating an underground pipe repair system for repairing a joint between a service pipe and a branch pipe. The method may include positioning an underground pipe repair device at the joint. The underground pipe repair device may include a T-shaped joint liner having a base portion extending laterally in the service pipe, and an arm portion extending vertically into the branch pipe, and at least one retention device embedded in the base portion adjacent an opening in the branch pipe. The method may include curing the underground pipe repair device to the joint, and positioning an alignment device to be coupled to the at least one retention device. The method also may comprise applying and curing a service pipe liner for the service pipe, and cutting an opening in the service pipe liner of the service pipe aligned with the alignment device so that a portion the service pipe liner of the service pipe adjacent the opening of the branch pipe is removed.

DETAILED DESCRIPTION

Figure 1:
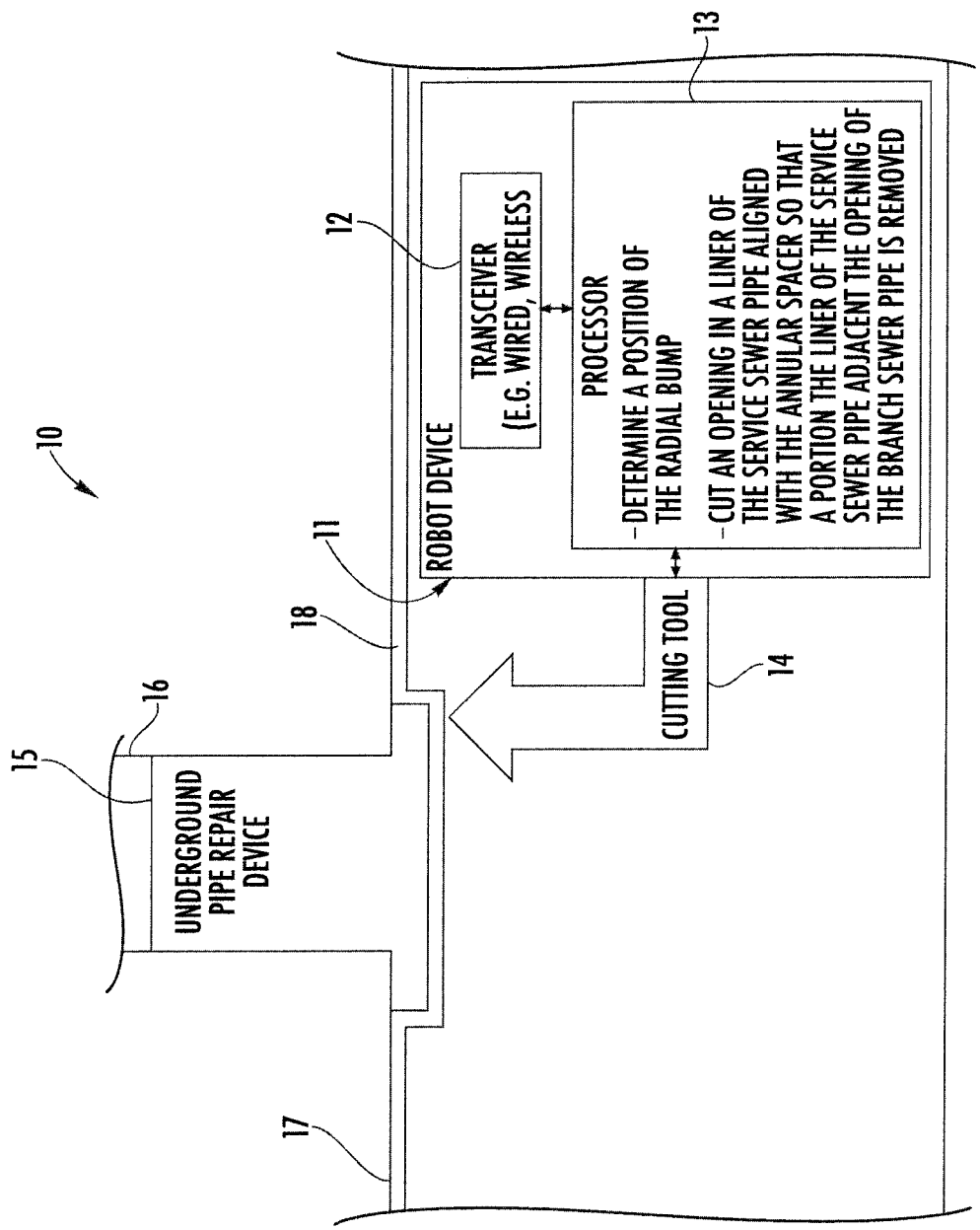
FIG. 1 is a schematic diagram of an underground pipe repair system, according to the present disclosure.

The present disclosure will now be described more fully hereinafter with reference to the accompanying drawings, in which several embodiments of the invention are shown. This present disclosure may, however, be embodied in many different forms and should not be construed as limited to the embodiments set forth herein. Rather, these embodiments are provided so that this disclosure will be thorough and complete, and will fully convey the scope of the present disclosure to those skilled in the art. Like numbers refer to like elements throughout, and prime notation is used to indicate similar elements in alternative embodiments. Also, base 100 reference numerals are used to indicate similar elements in alternative embodiments.

Referring initially to FIG. 1, an underground pipe repair system 10 for a joint between a service sewer pipe 17 and a branch sewer pipe 16. The underground pipe repair system 10 illustratively includes an underground pipe repair device 15, and a robot device 11 comprising a transceiver 12 (e.g. wired or wireless), a cutting tool 14, and a processor 13 coupled to the transceiver and the cutting tool. Although not shown, the underground pipe repair system 10 may include a surface controller configured to control operation of the robot device 11 via the transceiver 12.

The robot device 11 may include a video sensor, for example, a high definition video camera with environmental protection (e.g. water and dust proofing). The processor 13 is coupled to the video sensor, cooperates with the transceiver 12, and is configured to transmit video data from the video sensor to the controller. In some embodiments, the robot device 11 may include a battery power source coupled to the processor 13, the transceiver 12, and the cutting tool 14. In other embodiments, the robot device 11 may include a wired powered source at the surface.

The underground pipe repair device 15 illustratively includes a first T-shaped joint liner 19 having a base portion 21 extending laterally in the service sewer pipe 17, and an arm portion 20 extending vertically into the branch sewer pipe 16. In some embodiments, the base portion 21 and the arm portion 20 are integral and monolithic, but in other embodiments, the base portion 21 and the arm portion 20 may be modular and coupled together via stitching, for example.

The underground pipe repair device 15 illustratively includes a second ring-shaped liner 22 under the first T-shaped joint liner 19 and aligned with an opening in the branch sewer pipe 16. The second ring-shaped liner 22 includes a medial opening positioned over the opening in the branch sewer pipe 16.

The underground pipe repair device 15 illustratively includes an annular spacer 25 aligned with the opening in the branch sewer pipe 16 and being between the first T-shaped joint liner 19 and the second ring-shaped liner 22. The annular spacer 25 includes a radial step 26. In other embodiments, the annular spacer 25 may comprise a plurality of radial steps.

The second ring-shaped liner 22 is coupled to the base portion 21 of the first T-shaped joint liner 19 to retain the annular spacer 25. The annular spacer 25 extends vertically into the service sewer pipe 17 so that the second ring-shaped liner 22 has a radial bump 23 about the opening of the branch sewer pipe 16.

The first T-shaped joint liner 19 and the second ring-shaped liner 22 each comprises a flexible curable material. The flexible curable material may be curable via ultraviolet radiation, infrared radiation (i.e. thermal energy), a chemical immersion, or water, for example.

The processor 13 is configured to cause the robot device 11 to move through the service sewer pipe 17 and determine a position of the radial bump 23, and operate the cutting tool 14 to cut an opening in a liner 18 of the service sewer pipe aligned with the annular spacer 25 so that a portion of the liner of the service sewer pipe adjacent the opening of the branch sewer pipe 16 is removed.

In the illustrated embodiment, the underground pipe repair device 15 includes a ring-shaped release tab 28 coupled to the second ring-shaped liner 22 and configured to prevent the liner 18 for the service sewer pipe 17 from bonding to adjacent portions of the second ring-shaped liner. The ring-shaped release tab 28 may be coupled to the second ring-shaped liner 22 via an adhesive layer (not shown) interposed between the ring-shaped release tab and the second ring-shaped liner. In other embodiments, the ring-shaped release tab 28 may be coupled to the second ring-shaped liner 22 via mechanical interface, such as buttons, rivets, for example.

During repair of the joint, the liner 18 for the service sewer pipe 17 is installed and cured after the installation and curing of the first T-shaped joint liner 19. The ring-shaped release tab 28 provides a barrier between adjacent portions 24 of the liner 18 for the service sewer pipe 17 and the first T-shaped joint liner 19. In typical approaches, the curing of the liner 18 for the service sewer pipe 17 may damage the adjacent portions of the first T-shaped joint liner 19, but in the disclosed approach, the ring-shaped release tab 28 provides protection from the second curing process. In fact, once the robot device 11 performs the cutting operation, the portion of the liner 18 of the service sewer pipe 17 adjacent the opening of the branch sewer pipe 16 is released.

In some embodiments (FIG. 5), the annular spacer 25 defines a plurality of radial gaps. During installation of the underground pipe repair device 15 at the joint, the annular spacer 25 is configured to flex to fit the opening in the branch sewer pipe 16. For example, the annular spacer 25 may be ellipse-shaped, or circle-shaped. The annular spacer 25 can be filled with a sealant to act as a gasket, further enhancing a seal between the service pipe liner and the first T-shaped joint liner 19.

The radial step 26 of the annular spacer 25 defines a pair of radial portions 27a-27b. Each radial portion 27a-27b of the annular spacer 25 has a different readily identifiable color (e.g. a bright primary color). Also, the annular spacer 25 may comprise a plastic material, and/or a frangible material (i.e. permitting the cutting tool 14 to readily remove portions of the annular spacer). Advantageously, the user operating the robot device 11 may precisely control the cutting step via the color indicators. This is in contrast to typical approaches where the user could inadvertently puncture the replacement liner.

Moreover, the stepped shape of the annular spacer enables the robot device 11 to be equipped with a lateral cutting tool, i.e. the cutting blade is parallel to the service sewer pipe 17. This horizontal cutting blade also prevents damage to the replacement liner since a vertical blade is not used.

In the illustrated embodiment, the joint is between the service sewer pipe 17 and the branch sewer pipe 16. In other embodiments, the underground pipe repair system 10 can be used on other underground pipe systems (e.g. storm water, drainage) where trenchless repair is desirable.

Figure 4:
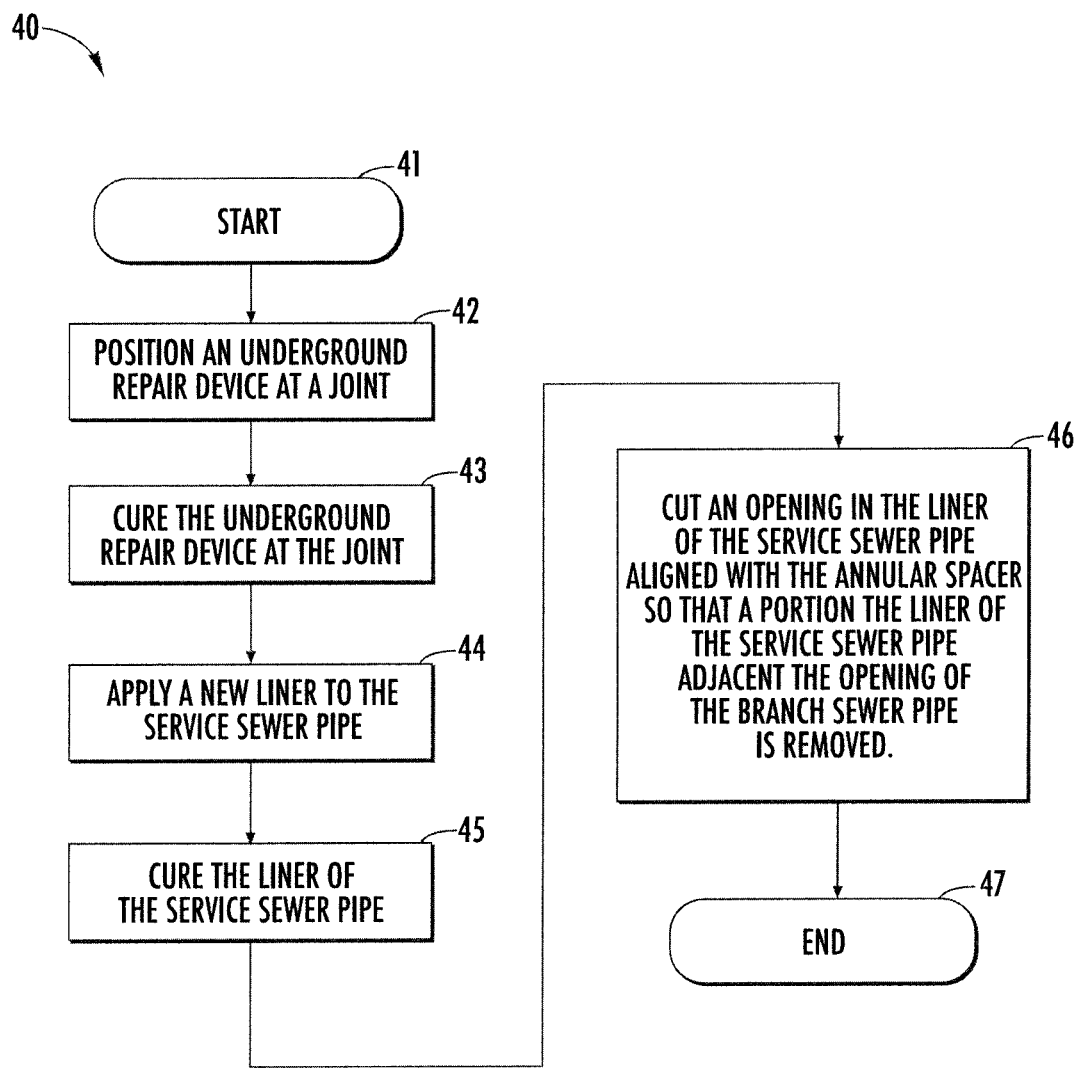
FIG. 4 is a flowchart illustrating a method for operating the underground pipe repair system of FIG. 1.

Referring now additionally to FIG. 4 and to a flowchart 40 therein, another aspect is directed to a method for operating an underground pipe repair system 10 for repairing a joint between a service sewer pipe 17 and a branch sewer pipe 16. The method comprises positioning an underground pipe repair device 15 at the joint. (Blocks 41-42). The underground pipe repair device 15 comprises a first T-shaped joint liner 19 having a base portion 21 extending laterally in the service sewer pipe 17, and an arm portion 20 extending vertically into the branch sewer pipe 16, and a second ring-shaped liner 22 under the first T-shaped joint liner and aligned with an opening in the branch sewer pipe.

The underground pipe repair device 15 comprises an annular spacer 25 aligned with the opening in the branch sewer pipe 16 and being between the first T-shaped joint liner 19 and the second ring-shaped liner 22. The annular spacer 25 includes at least one radial step 26, and the second ring-shaped liner 22 is coupled to the base portion 21 of the first T-shaped joint liner 19 to retain the annular spacer. The annular spacer 25 extends vertically into the service sewer pipe 17 so that the second ring-shaped liner 22 has a radial bump 23 about the opening of the branch sewer pipe 16.

The method also includes curing the underground pipe repair device 15 to the joint (Block 43), applying and curing a liner 18 for the service sewer pipe 17 (Blocks 44-45), and cutting an opening in the liner of the service sewer pipe aligned with the annular spacer 25 so that a portion the liner of the service sewer pipe adjacent the opening of the branch sewer pipe 16 is removed. (Blocks 46-47).

Figure 2:
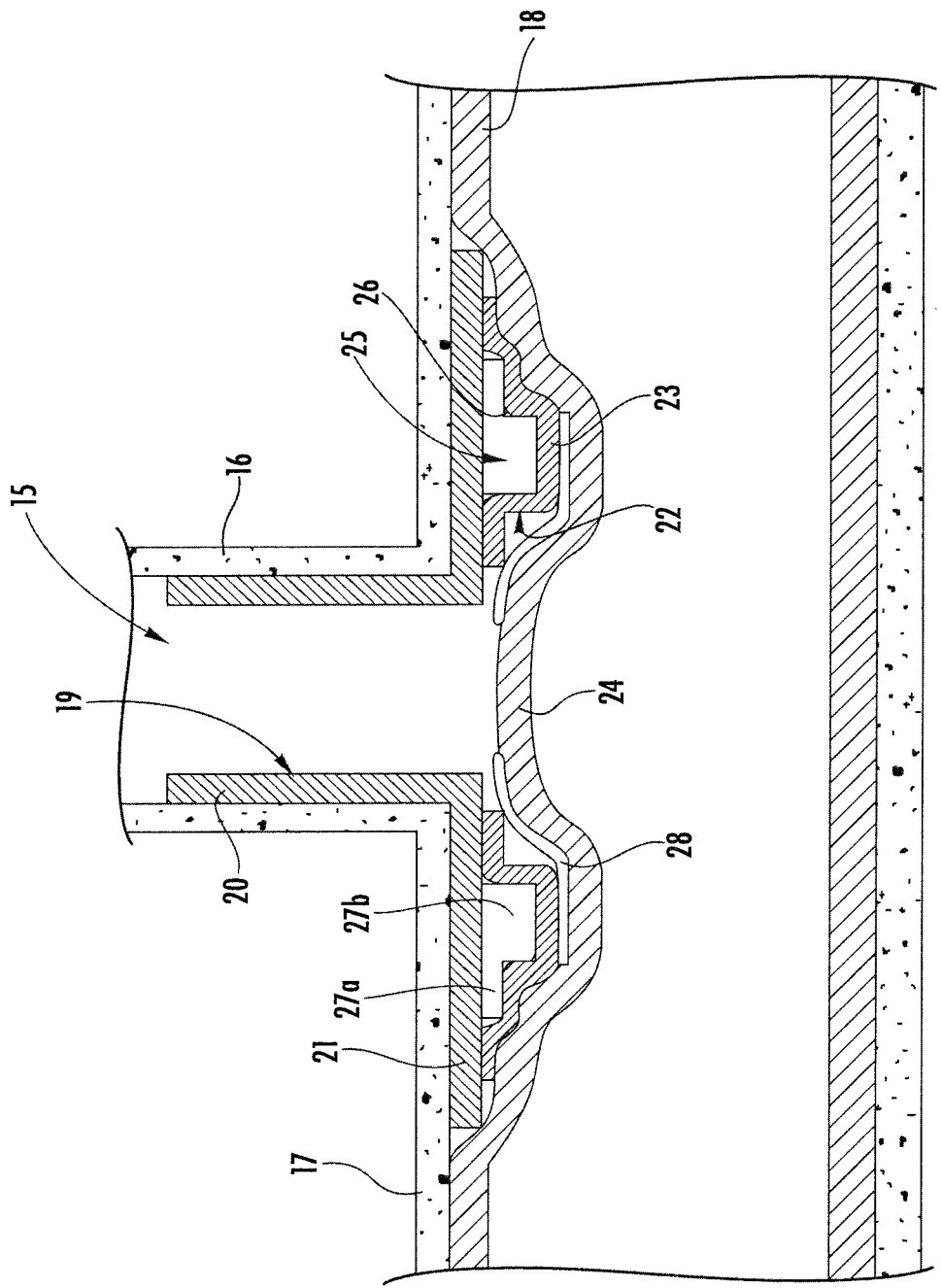
FIG. 2 is a schematic diagram of an underground pipe repair device, according to a first example embodiment.

In some embodiments (FIG. 2), the underground pipe repair device 15 may comprise a ring-shaped release tab 28 coupled to the second ring-shaped liner 22, and the method may further comprise preventing the liner 18 for the service sewer pipe 17 from bonding to adjacent portions of the second ring-shaped liner. In other embodiments (FIG. 3), the underground pipe repair device 15 may include a coating layer 28' on the second ring-shaped liner 22, and the method may further comprise preventing the liner 18 for the service sewer pipe 17 from bonding to adjacent portions of the second ring-shaped liner.

Also, the annular spacer 25 may define a plurality of radial gaps, and the method may further comprise flexing a shape of the annular spacer to fit the opening in the branch sewer pipe 16. The at least one radial step 26 of the annular spacer 25 may define at least one pair of radial portions 27a-27b, and each radial portion of the annular spacer may have a different color. The method may also comprise controlling the cutting based upon visibility of the different color of each radial portion 27a-27b.

Figure 3:
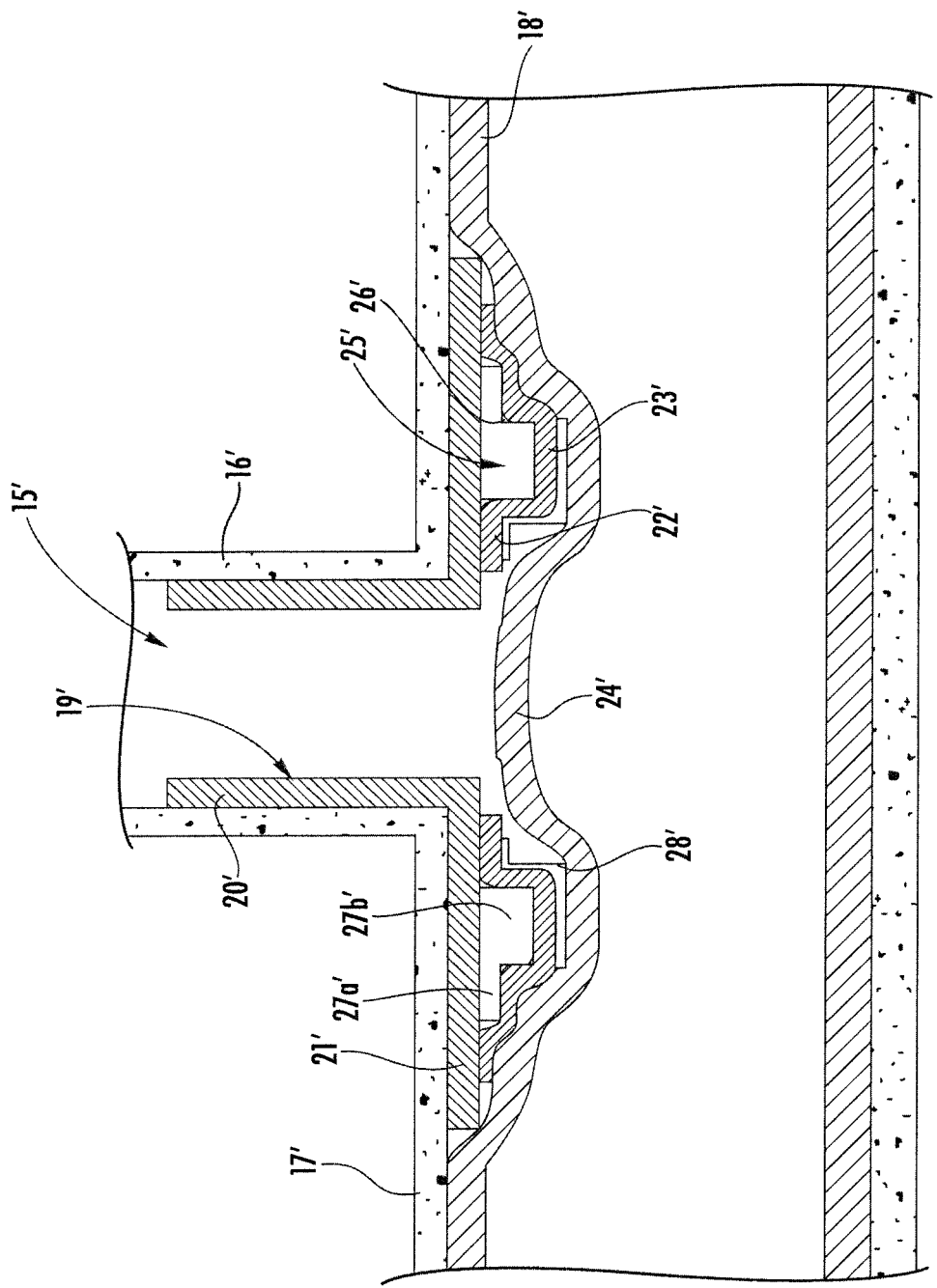
FIG. 3 is a schematic diagram of an underground pipe repair device, according to a second example embodiment.

Referring now additionally to FIG. 3, another embodiment of the underground pipe repair device 15' is now described. In this embodiment of the underground pipe repair device 15', those elements already discussed above with respect to FIGS. 1-2 are given prime notation and most require no further discussion herein. This embodiment differs from the previous embodiment in that this underground pipe repair device 15' has a coating layer 28' on the second ring-shaped liner 22' and configured to prevent the liner 18' for the service sewer pipe 17' from bonding to adjacent portions of the second ring-shaped liner. The coating layer 28' may comprise a material that has chemically resistant characteristics to the curing process of the liner 18' for the service sewer pipe 17'. The material may comprise polytetrafluoroethylene (PTFE), for example.

Figure 5:
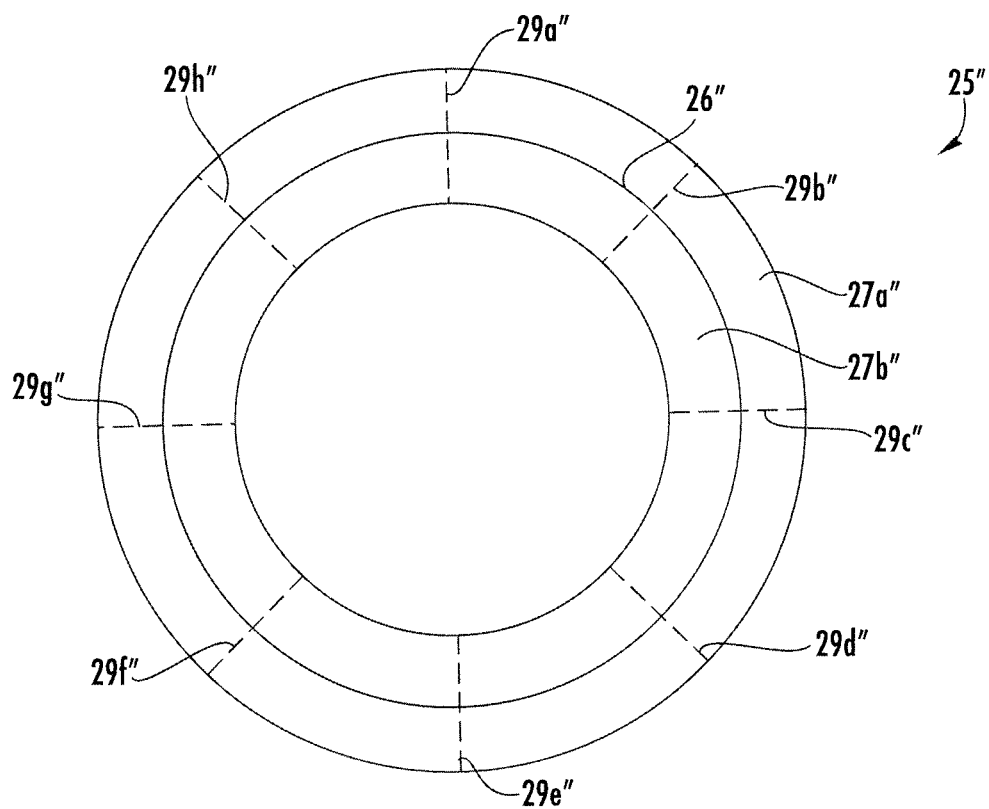
FIG. 5 is a schematic top plan view of another embodiment of the annular spacer from the underground pipe repair device, according to an example embodiment.

Referring now additionally to FIG. 5, another embodiment of the annular spacer 25" is now described. In this embodiment of the annular spacer 25", those elements already discussed above with respect to FIGS. 1-2 are given double prime notation and most require no further discussion herein. This embodiment differs from the previous embodiment in that this annular spacer 25" illustratively includes a plurality of radial gaps 29a"-29h". The plurality of radial gaps 29a"-29h" permits the annular spacer 25" to flex and fit a branch pipe opening. In the illustrated embodiment, the plurality of radial gaps 29a"-29h" is spaced at approximately 45 degrees, but other arrangements are possible, for example, spacing being >10 degrees, and <90 degrees.

Figure 6:
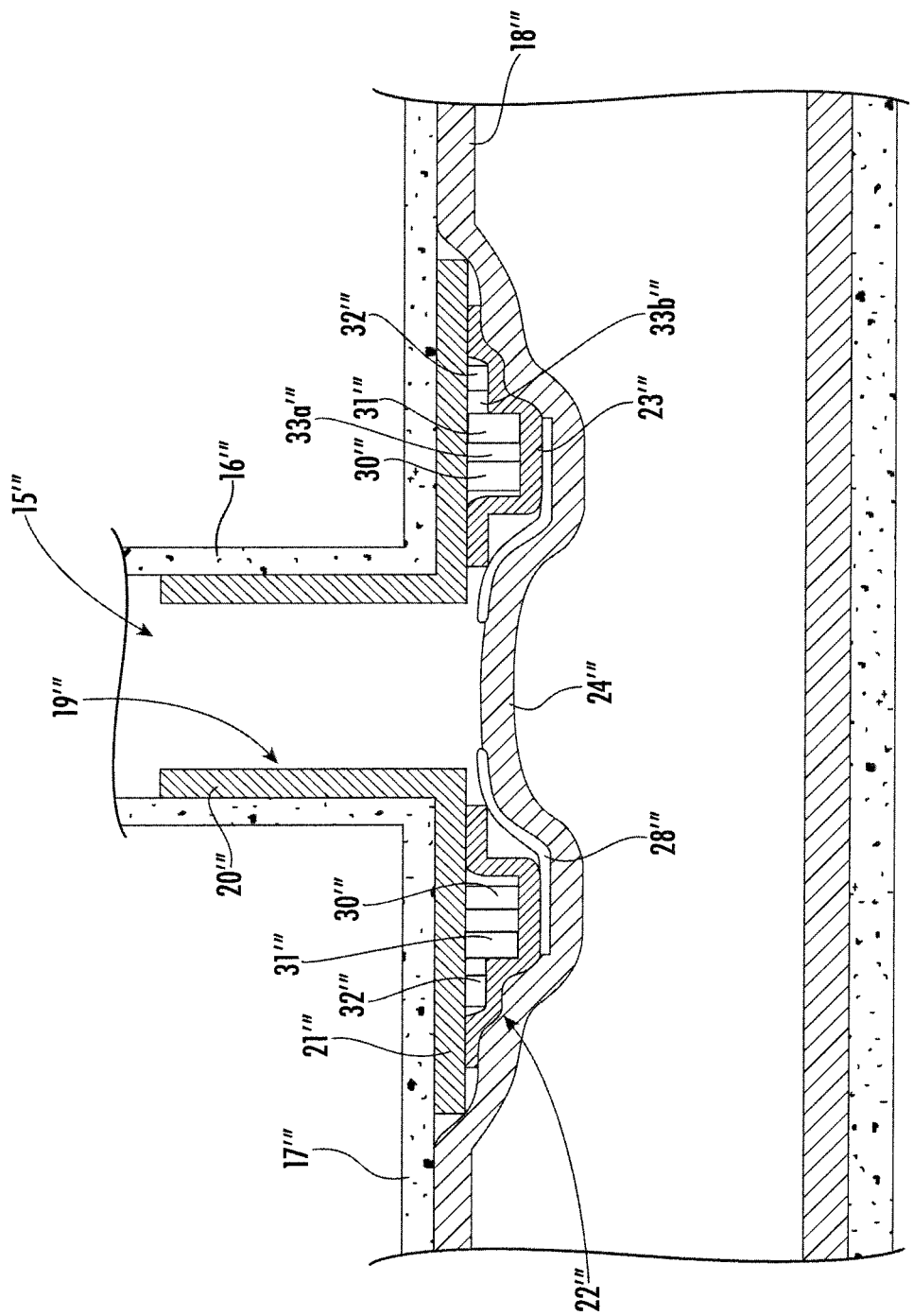
FIG. 6 is a schematic diagram of an underground pipe repair device, according to a third example embodiment.

Referring now additionally to FIG. 6, another embodiment of the underground pipe repair device 15''' is now described. In this embodiment of the underground pipe repair device 15''', those elements already discussed above with respect to FIGS. 1-3 & 5 are given triple prime notation and most require no further discussion herein.

This embodiment differs from the previous embodiment in that this underground pipe repair device 15''' illustratively includes a first T-shaped joint liner 19''' having a base portion 21''' extending laterally in the service pipe 17''', and an arm portion 20''' extending vertically into the branch pipe 16''', and a first annular spacer 30''' aligned with an opening in the branch pipe and being coupled to an underside of the first T-shaped joint liner. The underground pipe repair device illustratively includes a second annular spacer 31''' aligned with the opening in the branch pipe and being coupled to the underside of the first T-shaped joint liner 19'''. The first annular spacer 30''' is radially within the second annular spacer 31'''.

The underground pipe repair device 15''' illustratively includes a third annular spacer 32''' aligned with the opening in the branch pipe 16''' and being coupled to the underside of the first T-shaped joint liner 19'''. The second annular spacer 31''' is radially within the third annular spacer 32'''.

One or both of second annular spacer 31''' and the third annular spacer 32''' comprise a swellable seal. In particular, the swellable seal is a seal that swells in the presence of moisture (e.g. a water swellable material). The swellable seal may comprise one or more of a swellable seal, a bonding agent, a hydrophilic substance, and/or sealant. Once the underground pipe repair device 15''' is installed at the branch pipe 16''', as ground water attempts to penetrate laterally from the service pipe liner 18''', the swellable annular spacers will expand and create a radial seal between the base portion 21''' of the first T-shaped joint liner 19''' and the second ring-shaped liner 22'''.

One or both of second annular spacer 31''' and the third annular spacer 32''' comprise a color coded frangible indicator material (e.g. color coded polymer plastic) for indicating a location of a cutting incision. Also, the first, second, and third annular spacers 30'''-32''' define first and second annular gaps 33a'''-33b''' therebetween.

In the illustrated embodiment, the underground pipe repair device 15''' illustratively includes a second ring-shaped liner 22''' under the first T-shaped joint liner 19''' and aligned with the opening in the branch pipe 16'''. The second ring-shaped liner 22''' is coupled to the base portion 21''' of the first T-shaped joint liner 19''' to retain the first annular spacer 30''', the second annular spacer 31''', and the third annular spacer 32'''. The underground pipe repair device illustratively includes a ring-shaped release tab 28''' coupled to the second ring-shaped liner 22''' and configured to prevent a liner 18''' for the service pipe 17''' from bonding to adjacent portions of the second ring-shaped liner. In other embodiments (similar to the embodiment of FIG. 3), the underground pipe repair device 15''' may further comprise a coating layer on the second ring-shaped liner 22''' and configured to prevent the liner 18''' for the service pipe 17''' from bonding to adjacent portions of the second ring-shaped liner.

In some embodiments, the second ring-shaped liner 22''' and the ring-shaped release tab 28''' (or coating layer) are omitted. In these embodiments, the swellable annular spacers will expand and create the radial seal between the base portion 21''' of the first T-shaped joint liner 19''' and the liner 18''' for the service pipe 17'''.

Also, the first annular spacer 30''' illustratively extends vertically into the service pipe 17''' so that the liner 18''' for the service pipe has a radial bump 23''' about the opening of the branch pipe 16'''. The first annular spacer 30''' and the second annular spacer 31''' each illustratively has a greater height than the third annular spacer 32'''. The first and second annular spacers 30''', 31''' each may comprise a plastic material. Each of the first annular spacer 30''' and second annular spacer 31''' may have a different color. The first annular spacer 30''' may comprise a frangible material.

In other embodiments, the underground pipe repair device 15''' may include additional annular spacers above and beyond the first, second, and third annular spacers 30'''-32'''. The additional annular spacers may comprise either swellable material for providing more annular seals or frangible material for additional cutting indicators.

Figure 7:
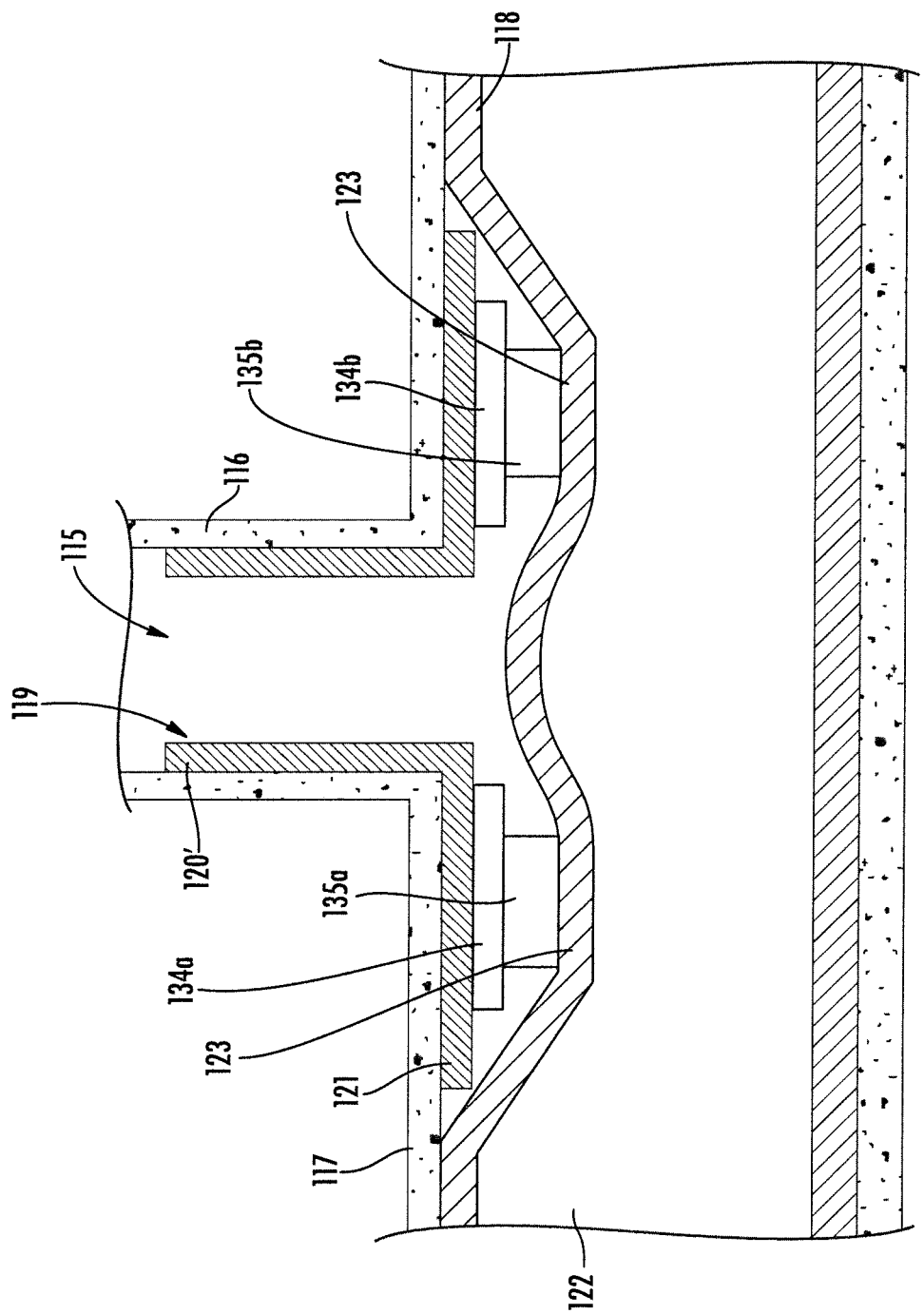
FIG. 7 is a schematic diagram of an underground pipe repair device, according to a fourth example embodiment.
Figure 8:
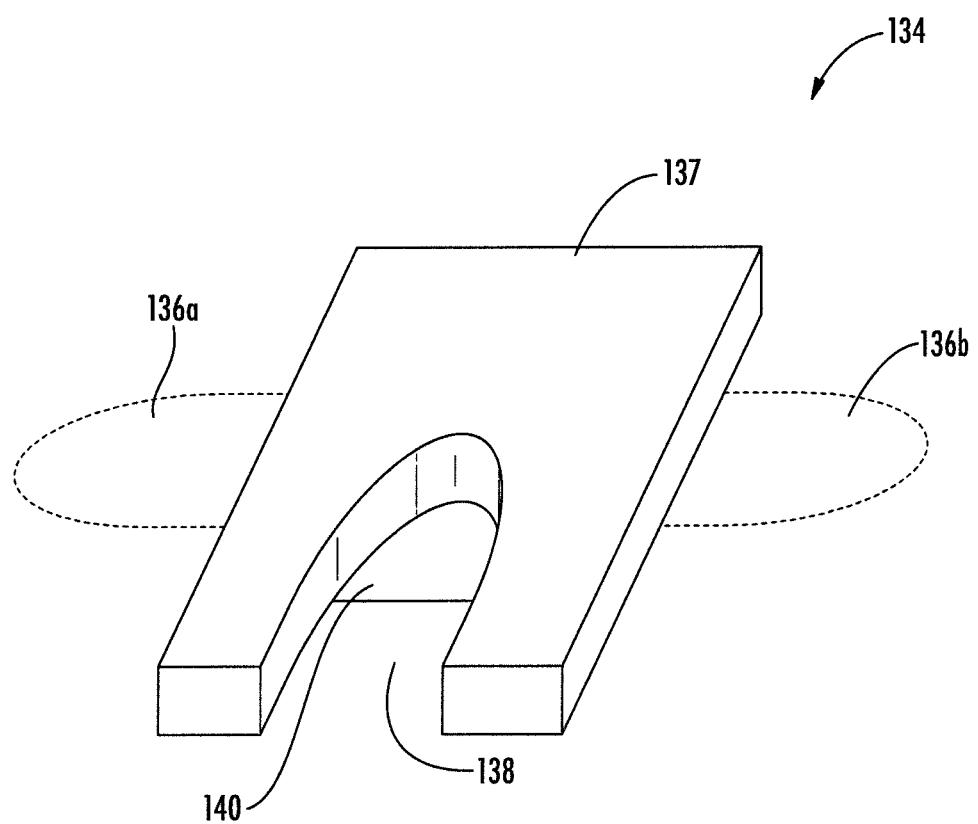
FIG. 8 is a schematic perspective view of a retention device from the underground pipe repair device, according to an example embodiment.
Figure 12:
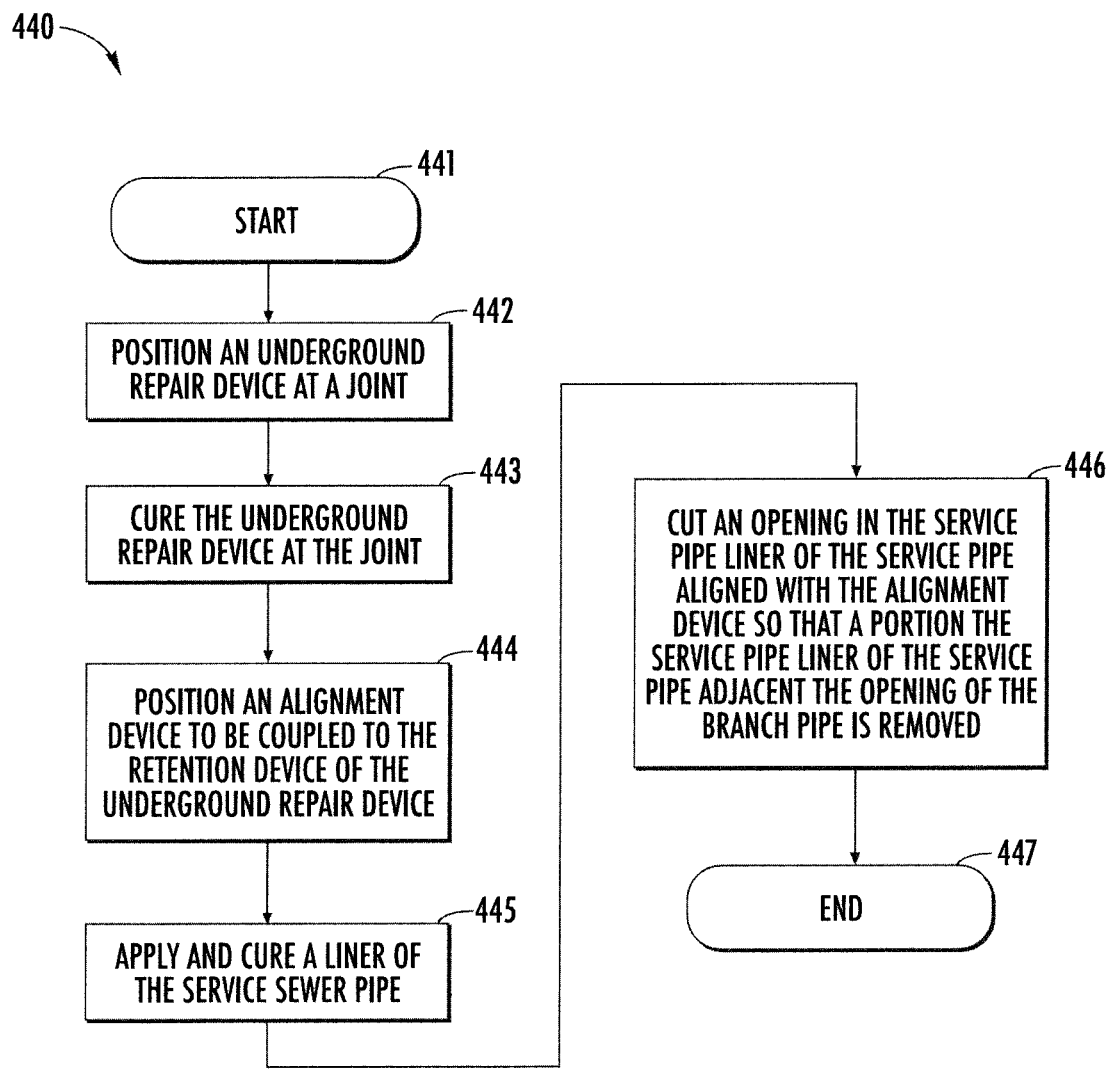
FIG. 12 is a flowchart illustrating a method for operating the underground pipe repair system of FIG. 1.

Referring now additionally to FIGS. 7-8 and 12, another embodiment of the underground pipe repair device 115 is now described. Also, with reference to a flowchart 440, a method for operating the underground pipe repair device 115 is also now described. (Block 441). In this embodiment of the underground pipe repair device 115, those elements already discussed above with respect to FIGS. 1-3 & 6 are incremented by 100 and most require no further discussion herein. This embodiment differs from the previous embodiment in that this underground pipe repair device 115 illustratively includes a T-shaped joint liner 119 having a base portion 121 extending laterally in the service pipe 117, and an arm portion 120 extending vertically into the branch pipe 116. The underground pipe repair device 115 illustratively includes a plurality of retention devices 134a-134b embedded in the base portion adjacent an opening in the branch pipe 116.

The underground pipe repair device 115 illustratively includes an alignment device 135a-135b to be coupled to the plurality of retention device 134a-134b, and a service pipe liner 118 extending in the service pipe 117 and under the T-shaped joint liner 119 and the alignment device. The alignment device 135a-135b extends vertically into the service pipe 117 so that the service pipe liner 118 has a radial bump 123 about the opening in the branch pipe 116.

As perhaps best seen in FIG. 8, each retention device 134a-134b illustratively includes an elongate body 137, and a plurality of tabs 136a-136b extending laterally from the elongate body. For example, in some embodiments, the plurality of tabs 136a-136b may be woven into the fabric of the base portion 121. The elongate body 137 defines a recess 138 therein, and illustratively includes a shelf portion 140 extending within the recess. The alignment device 135-135b may be at least partially received by the recess 138. The alignment device 135a-135b may comprise the annular spacers 25, 25' of the embodiments of FIGS. 2-3 or the first, second, and third annular spacers 30'''-32''' of the embodiment of FIG. 6.

As will be appreciated, a method for operating an underground pipe repair system for repairing a joint between the service pipe 117 and a branch pipe 116 is now described and uses the underground pipe repair device 115. The method illustratively includes positioning the underground pipe repair device 115 at the joint. (Block 442). The method may include curing the underground pipe repair device 115 to the joint. (Block 443). Once the underground pipe repair device 115 is cured to the joint, the method includes positioning an alignment device 135a-135b to be coupled to the plurality of retention devices 134a-134b. (Block 444).

In some embodiments, such as in FIG. 8, the alignment device 135a-135b would include a protruding portion (e.g. a hook for hanging on the shelf portion 140) for being inserted into the recess 138 of each retention device 134a-134b. In other embodiments, each retention device 134a-134b may comprise a hook and loop interface (i.e. the opposing interface being on the alignment device 135a-135b). In other embodiments, each retention device 134a-134b may comprise a grommet, eyelet, or magnetic device embedded in the base portion 121. Indeed, any coupling/physical interface device can be used so long as it can support the weight of the alignment device 135a-135b.

The method also illustratively includes applying and curing the service pipe liner 118 for the service pipe 117 (Block 445), and cutting an opening in the service pipe liner of the service pipe aligned with the alignment device 135a-135b so that a portion the service pipe liner of the service pipe adjacent the opening of the branch pipe 116 is removed. (Blocks 446-447).

Advantageously, in embodiments where the alignment device 135a-135b comprises the first, second, and third annular spacers 30'''-32''' of the embodiment of FIG. 6, the T-shaped joint liner 119 is completely cured to the joint before attachment of the alignment device. This can helpful in embodiments where one or both of second annular spacer 31''' and the third annular spacer 32''' comprise a swellable seal. In past approaches where the alignment device 135a-135b is integrated with the T-shaped joint liner 119, the swellable seals would prematurely absorb ambient water and expand. This would be before application of the service pipe liner 118, and since these swellable seals are intended to abut and swell up against this same service piper liner, this could lead to unwanted water intrusion after the relining. Positively, the alignment device 135a-135b is applied right before the application of the service pipe liner 118, assuring that the swellable seals expand against the service pipe liner.

Figure 9:
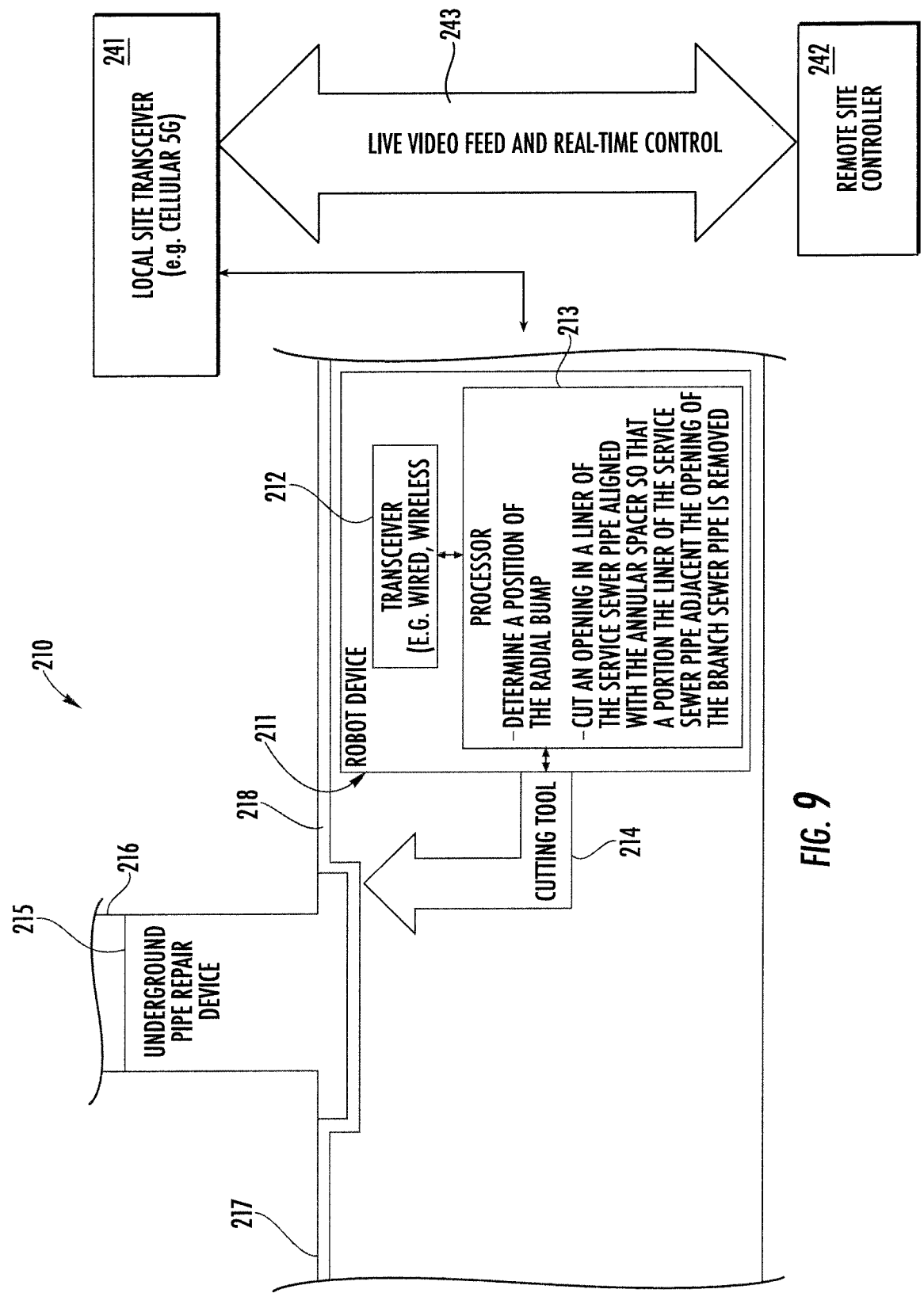
FIG. 9 is a schematic diagram of an underground pipe repair system, according to another example embodiment.

Referring now additionally to FIG. 9, another embodiment of the underground pipe repair system 210 is now described. In this embodiment of the underground pipe repair system 210, those elements already discussed above with respect to FIGS. 1-3 & 6, 7 are incremented by 200 and most require no further discussion herein. This embodiment differs from the previous embodiment in that this underground pipe repair system 210 illustratively includes a local site transceiver 241 in communication with the robot device 211. As will be appreciated, the local site transceiver 241 uses a wired or wireless connection to the transceiver 212 of the robot device 211. The local site transceiver 241 may comprise a large bandwidth (e.g. >50 Mbps), low latency (<1 ms) wireless transceiver, such as, for example, a 5th-Generation Wireless Systems (5G) technology that satisfies ITU IMT-2020 requirements and 3GPP Release 15, which is incorporated by reference in its entirety.

The underground pipe repair system 210 also illustratively includes a remote site controller 242 (e.g. spaced apart by several or more miles) in communication with the local site transceiver 241 over a real-time connection 243. Helpfully, a user at the remote site controller 242 can operate the robot device 211 remotely, or perhaps across long distances. The real-time connection 243 would provide a live video feed to the user at the remote site controller 242, and the user could manipulate the robot device 211 at one or more sites, leveraging the connection to reduce personnel costs.

In some embodiments (not shown), the local site transceiver 241 illustratively includes a location module (e.g. global positioning system (GPS) module) configured to generate location data for the underground pipe repair system 210, and a module configured to provide a relative position (e.g. number of meters down pipe and a directional element) of the robot device 211. The local site transceiver 241 may also include a wireless local area network (WLAN) base station (not shown) (e.g. IEEE 802.11x, Bluetooth, WiMAX, Zigbee IEEE 802.15.4). The WLAN base station is configured to permit regulatory officials a wireless interconnect with the underground pipe repair system 210. For example, an inspector may login the underground pipe repair system 210 and determine whether work is occurring in the appropriate permitted location.

Figure 10:
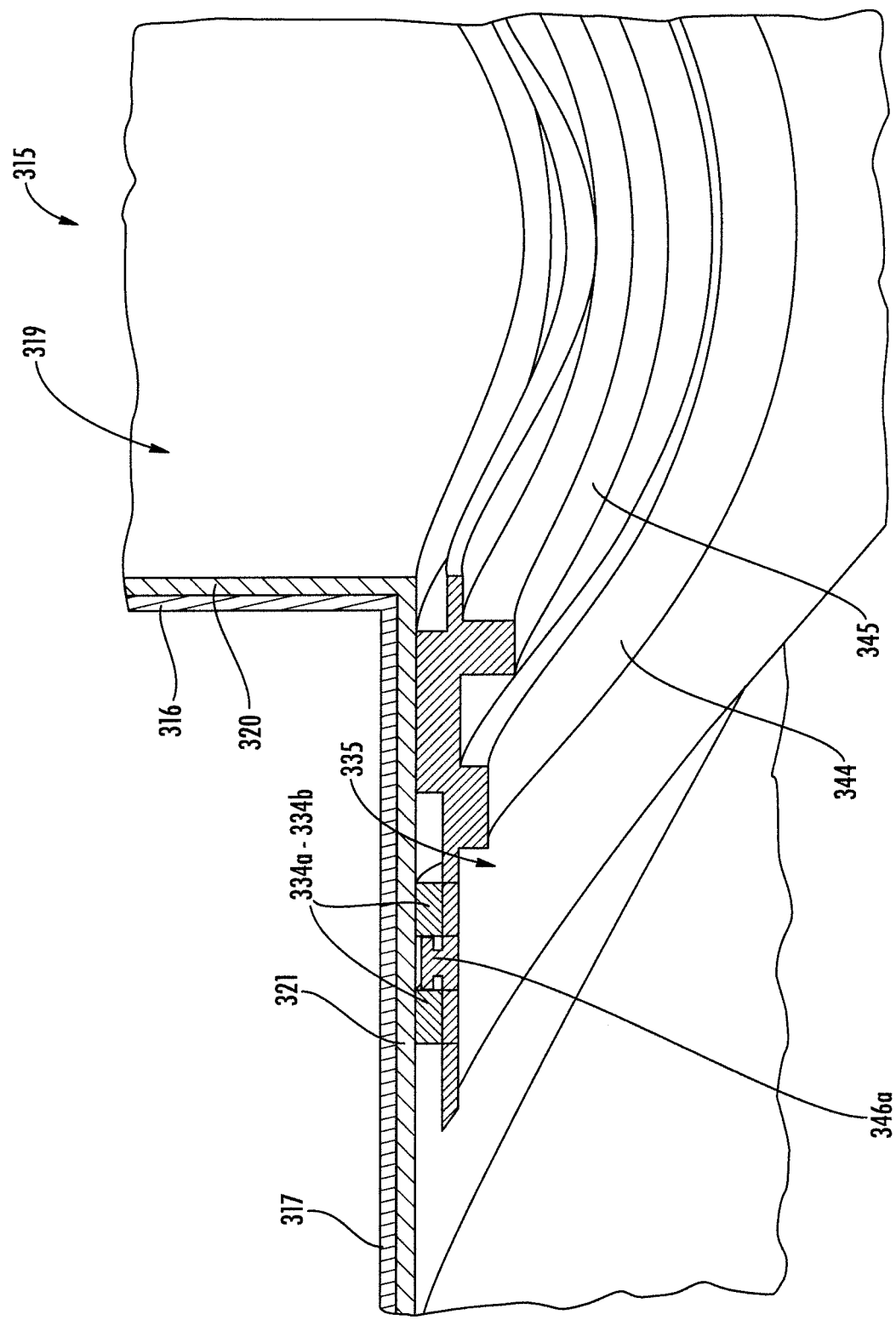
FIG. 10 is a schematic diagram of a portion of an underground pipe repair device, according to yet another example embodiment.
Figure 11:
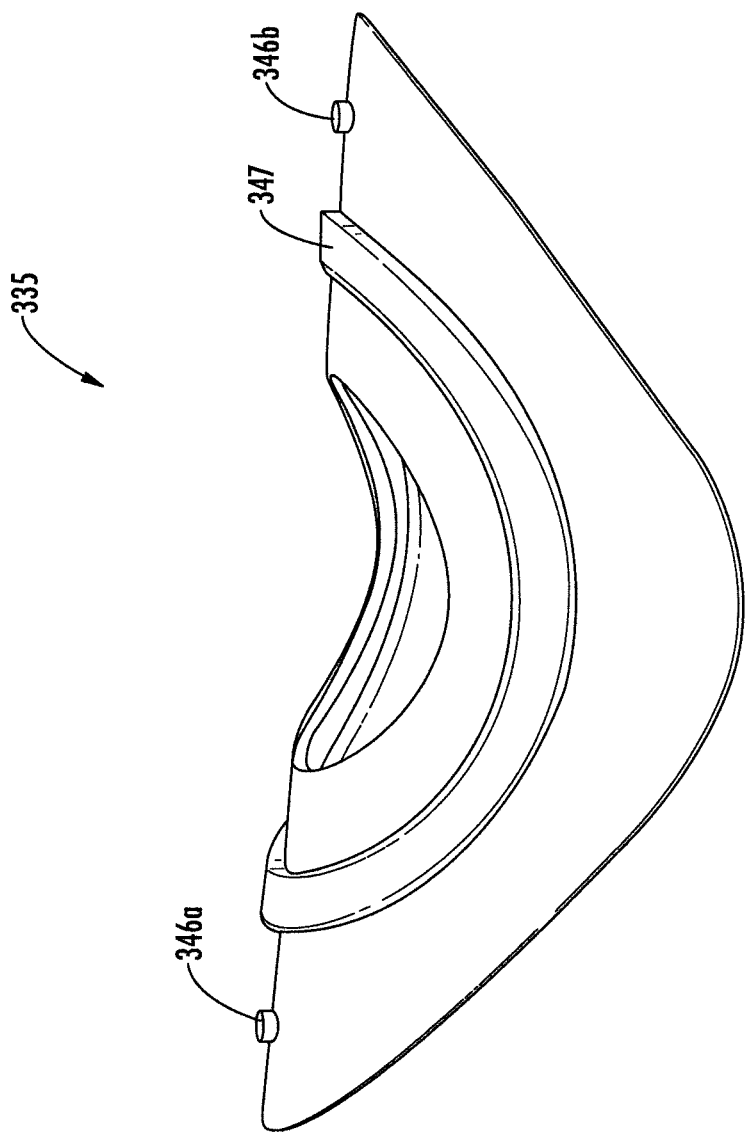
FIG. 11 is a schematic perspective view of the alignment device from the underground pipe repair device of FIG. 10.

Referring now additionally to FIGS. 10-11, another embodiment of the underground pipe repair device 315 is now described. In this embodiment of the underground pipe repair device 315, those elements already discussed above with respect to FIGS. 7-8 are incremented by 300 and most require no further discussion herein. This embodiment differs from the previous embodiment in that this underground pipe repair device 315 illustratively includes the retention device comprising a tongue and groove interface.

The underground pipe repair device 315 illustratively includes first and second annular rings 334a-334b defining a groove therebetween. The underground pipe repair device 315 illustratively includes an alignment device 335 to be coupled to the first and second annular rings 334a-334b.

The alignment device 335 illustratively includes a tongue portion 346 configured to interface (i.e. to fit into) with the groove. Here, the tongue portion 346 comprises a T-shaped tab structure, but other forms and shapes can be used. Also, the first and second annular rings 334a-334b may include radially inward protrusions to press and retain the tongue portion 346. That is, in these embodiments, the tongue portion 346 may snap fit into the groove. The alignment device 335 illustratively includes first and second annular spacers 344-345 of different height on an underside thereof for the robot device to find during the liner (not shown) cutting process. The alignment device 335 illustratively includes a third annular spacer 347 on the upper side thereof and configured to abut the base portion 321 of the T-shaped joint liner 319.

Many modifications and other embodiments of the present disclosure will come to the mind of one skilled in the art having the benefit of the teachings presented in the foregoing descriptions and the associated drawings. Therefore, it is understood that the present disclosure is not to be limited to the specific embodiments disclosed, and that modifications and embodiments are intended to be included within the scope of the appended claims.

That which is claimed is:

1. An underground pipe repair device for a joint between a service pipe and a branch pipe, the underground pipe repair device comprising:
   a T-shaped joint liner having a base portion extending laterally in the service pipe, and an arm portion extending vertically into the branch pipe;
   at least one retention device embedded in said base portion adjacent an opening in the branch pipe;
   an alignment device to be coupled to said at least one retention device; and
   a service pipe liner extending in the service pipe and under said T-shaped joint liner and said alignment device;
   said alignment device extending vertically into the service pipe so that said service pipe liner has a radial bump about the opening in the branch pipe;
   said at least one retention device and said alignment device defining a tongue and groove interface for coupling therebetween.

2. The underground pipe repair device of claim 1 wherein a tongue portion of said tongue and groove interface comprises a T-shaped tab structure.

3. An underground pipe repair device for a joint between a service pipe and a branch pipe, the underground pipe repair device comprising:
   a T-shaped joint liner having a base portion extending laterally in the service pipe, and an arm portion extending vertically into the branch pipe;
   at least one retention device embedded in said base portion adjacent an opening in the branch pipe;
   an alignment device to be coupled to said at least one retention device; and
   a service pipe liner extending in the service pipe and under said T-shaped joint liner and said alignment device;
   said alignment device extending vertically into the service pipe so that said service pipe liner has a radial bump about the opening in the branch pipe, said at least one retention device comprising an elongate body, and a plurality of tabs extending laterally from said elongate body, said elongate body defining a recess therein, said alignment device being at least partially received by the recess.

4. An underground pipe repair device for a joint between a service pipe and a branch pipe, the underground pipe repair device comprising:
   a T-shaped joint liner having a base portion extending laterally in the service pipe, and an arm portion extending vertically into the branch pipe;
   at least one retention device embedded in said base portion adjacent an opening in the branch pipe;

an alignment device to be coupled to said at least one retention device; and a service pipe liner extending in the service pipe and under said T-shaped joint liner and said alignment device;

said alignment device extending vertically into the service pipe so that said service pipe liner has a radial bump about the opening in the branch pipe, said alignment device comprising:

a first annular spacer aligned with the opening in the branch pipe and being coupled to said at least one retention device at an underside of said T-shaped joint liner;

a second annular spacer aligned with the opening in the branch pipe and being coupled to said at least one retention device, said first annular spacer being radially within said second annular spacer; and a third annular spacer aligned with the opening in the branch pipe and being coupled to said at least one retention device at the underside of said T-shaped joint liner, said second annular spacer being radially within said third annular spacer; and at least one of second annular spacer and said third annular spacer comprising a swellable seal.

5. The underground pipe repair device of claim 4 wherein at least one of said second annular spacer and said third annular spacer comprises a color coded material for indicating a location of a cutting incision.

6. The underground pipe repair device of claim 4 wherein said first annular spacer extends vertically into the service pipe to define the radial bump about the opening in the branch pipe.

7. The underground pipe repair device of claim 4 wherein said first annular spacer and said second annular spacer each has a greater height than said third annular spacer.

8. The underground pipe repair device of claim 4 wherein said first and second annular spacers each comprises a plastic material.

9. An underground pipe repair device for a joint between a service pipe and a branch pipe, the underground pipe repair device comprising:

a T-shaped joint liner having a base portion extending laterally in the service pipe, and an arm portion extending vertically into the branch pipe; and at least one retention device embedded in said base portion adjacent an opening in the branch pipe;

wherein an alignment device is to be coupled to said at least one retention device, said alignment device to extend vertically into the service pipe so that a service pipe liner has a radial bump about the opening in the branch pipe;

said at least one retention device and the alignment device defining a tongue and groove interface for coupling therebetween.

10. The underground pipe repair device of claim 9 wherein a tongue portion of said tongue and groove interface comprises a T-shaped tab structure.

11. An underground pipe repair device for a joint between a service pipe and a branch pipe, the underground pipe repair device comprising:

a T-shaped joint liner having a base portion extending laterally in the service pipe, and an arm portion extending vertically into the branch pipe; and at least one retention device embedded in said base portion adjacent an opening in the branch pipe;

wherein an alignment device is to be coupled to said at least one retention device, said alignment device to extend vertically into the service pipe so that a service pipe liner has a radial bump about the opening in the branch pipe, said at least one retention device comprising an elongate body, and a plurality of tabs extending laterally from said elongate body, said elongate body defining a recess therein, said alignment device being at least partially received by the recess.

12. An underground pipe repair device for a joint between a service pipe and a branch pipe, the underground pipe repair device comprising:

a T-shaped joint liner having a base portion extending laterally in the service pipe, and an arm portion extending vertically into the branch pipe; and at least one retention device embedded in said base portion adjacent an opening in the branch pipe;

wherein an alignment device is to be coupled to said at least one retention device, said alignment device to extend vertically into the service pipe so that a service pipe liner has a radial bump about the opening in the branch pipe, said alignment device comprising:

a first annular spacer aligned with the opening in the branch pipe and being coupled to said at least one retention device at an underside of said T-shaped joint liner;

a second annular spacer aligned with the opening in the branch pipe and being coupled to said at least one retention device, said first annular spacer being radially within said second annular spacer; and a third annular spacer aligned with the opening in the branch pipe and being coupled to said at least one retention device at the underside of said T-shaped joint liner, said second annular spacer being radially within said third annular spacer; and at least one of second annular spacer and said third annular spacer comprising a swellable seal.

13. The underground pipe repair device of claim 12 wherein at least one of said second annular spacer and said third annular spacer comprises a color coded material for indicating a location of a cutting incision.

14. A method for operating an underground pipe repair system for repairing a joint between a service pipe and a branch pipe, the method comprising:

positioning an underground pipe repair device at the joint, the underground pipe repair device comprising a T-shaped joint liner having a base portion extending laterally in the service pipe, and an arm portion extending vertically into the branch pipe, and at least one retention device embedded in the base portion adjacent an opening in the branch pipe;

curing the underground pipe repair device to the joint;

positioning an alignment device to be coupled to the at least one retention device, the at least one retention device and the alignment device defining a tongue and groove interface for coupling therebetween;

applying and curing a service pipe liner for the service pipe; and cutting an opening in the service pipe liner of the service pipe aligned with the alignment device so that a portion the service pipe liner of the service pipe adjacent the opening of the branch pipe is removed.

15. The method of claim 14 wherein a tongue portion of the tongue and groove interface comprises a T-shaped tab structure.

16. A method for operating an underground pipe repair system for repairing a joint between a service pipe and a branch pipe, the method comprising:

positioning an underground pipe repair device at the joint, the underground pipe repair device comprising
  a T-shaped joint liner having a base portion extending laterally in the service pipe, and an arm portion extending vertically into the branch pipe, and
  at least one retention device embedded in the base portion adjacent an opening in the branch pipe;
curing the underground pipe repair device to the joint;
positioning an alignment device to be coupled to the at least one retention device;
applying and curing a service pipe liner for the service pipe; and
cutting an opening in the service pipe liner of the service pipe aligned with the alignment device so that a portion the service pipe liner of the service pipe adjacent the opening of the branch pipe is removed, the at least one retention device comprising an elongate body, and a plurality of tabs extending laterally from the elongate body, the elongate body defining a recess therein, the alignment device being at least partially received by the recess.

17. A method for operating an underground pipe repair system for repairing a joint between a service pipe and a branch pipe, the method comprising:
  positioning an underground pipe repair device at the joint, the underground pipe repair device comprising
    a T-shaped joint liner having a base portion extending laterally in the service pipe, and an arm portion extending vertically into the branch pipe, and
    at least one retention device embedded in the base portion adjacent an opening in the branch pipe;
  curing the underground pipe repair device to the joint;
  positioning an alignment device to be coupled to the at least one retention device;
  applying and curing a service pipe liner for the service pipe; and
  cutting an opening in the service pipe liner of the service pipe aligned with the alignment device so that a portion the service pipe liner of the service pipe adjacent the opening of the branch pipe is removed, the alignment device comprising:
    a first annular spacer aligned with the opening in the branch pipe and being coupled to the at least one retention device at an underside of the T-shaped joint liner;
    a second annular spacer aligned with the opening in the branch pipe and being coupled to the at least one retention device, the first annular spacer being radially within the second annular spacer; and
    a third annular spacer aligned with the opening in the branch pipe and being coupled to the at least one retention device at the underside of the T-shaped joint liner, the second annular spacer being radially within the third annular spacer; and
    at least one of second annular spacer and the third annular spacer comprising a swellable seal.

18. The method of claim 17 wherein at least one of the second annular spacer and the third annular spacer comprises a color coded material for indicating a location of a cutting incision.

* * * * *